(12) United States Patent
Ichiyanagi et al.

(10) Patent No.: US 8,007,262 B2
(45) Date of Patent: Aug. 30, 2011

(54) COMPRESSOR WITH THRUST BEARING HAVING INSULAR PRESSURE- RECEIVING PORTIONS ON SLIDING SURFACE AND DIAMOND-LIKE CARBON LAYER ON ANOTHER SLIDING SURFACE

(75) Inventors: Hiroshi Ichiyanagi, Okazaki (JP);
Shigeki Iwanami, Okazaki (JP);
Sanemasa Kawabata, Kariya (JP)

(73) Assignee: DENSO CORPORATION, Kariya (JP)

( * ) Notice: Subject to any disclaimer, the term of this patent is extended or adjusted under 35 U.S.C. 154(b) by 482 days.

(21) Appl. No.: 12/153,532

(22) Filed: May 20, 2008

(65) Prior Publication Data
US 2009/0280018 A1    Nov. 12, 2009

(30) Foreign Application Priority Data

May 21, 2007    (JP) ................................. 2007-133689

(51) Int. Cl.
*F03C 2/00*    (2006.01)
*F03C 4/00*    (2006.01)
*F04C 18/00*   (2006.01)

(52) U.S. Cl. ........ 418/55.5; 418/55.1; 418/57; 418/178; 384/123; 384/420

(58) Field of Classification Search ........ 418/55.1–55.6, 418/57, 178, 179; 384/121, 123, 368, 420
See application file for complete search history.

(56) References Cited

U.S. PATENT DOCUMENTS 4,637,786 A * 1/1987 Matoba et al. ............... 418/55.3
2008/0050260 A1  2/2008 Iwanami et al.

FOREIGN PATENT DOCUMENTS

| JP | 2000136782 A | * | 5/2000 |
| JP | 2001-115959 A |   | 4/2001 |
| JP | A-2006-200455 |   | 8/2006 |
| JP | A-2006-316677 |   | 11/2006 |
| JP | 2008-051045 A |   | 3/2008 |

OTHER PUBLICATIONS

Notice of Reasons for Rejection mailed on Mar. 2, 2010 issued from the Japanese Patent Office in the corresponding Japanese patent application No. 2007-133689 (with English translation).
Office Action dated Jun. 30, 2009 from the Japan Patent Office in the corresponding JP Application No. 2007-133689 (and English Translation).

* cited by examiner

*Primary Examiner* — Theresa Trieu
(74) *Attorney, Agent, or Firm* — Posz Law Group, PLC

(57) ABSTRACT

A scroll compressor (11) comprising a thrust bearing (53) including a first sliding surface (100) and a second sliding surface (101) in opposed relation to the first sliding surface (100) is disclosed. The first sliding surface (100) is formed with a plurality of insular pressure-receiving portions (83) surrounded by grooves (85) and independent of each other. The part of the second sliding surface (101) in opposed relation to the pressure-receiving portions (83) is flat as compared with the first sliding surface (100). The outermost front surface of the second sliding surface (101) is formed with a diamond-like carbon layer (101*a*).

8 Claims, 8 Drawing Sheets

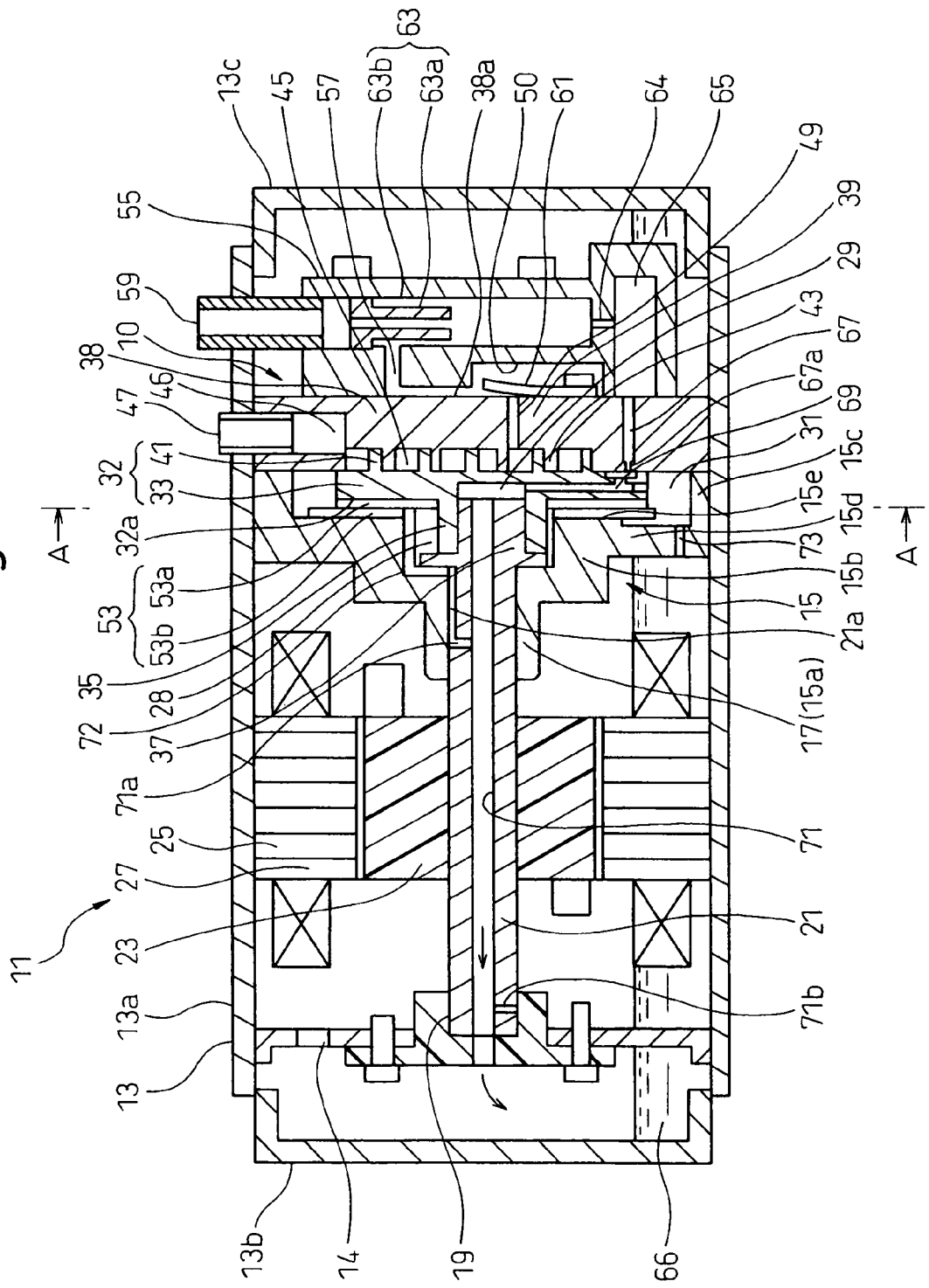

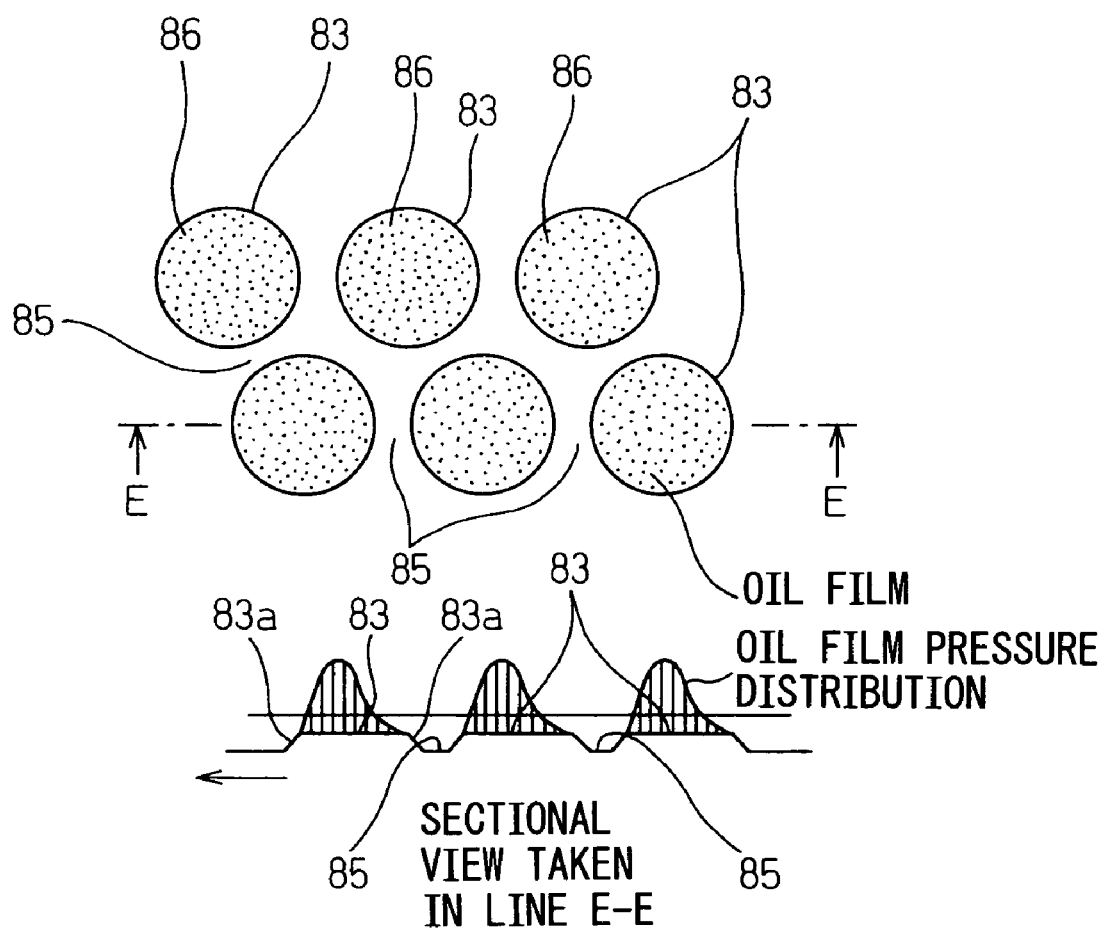

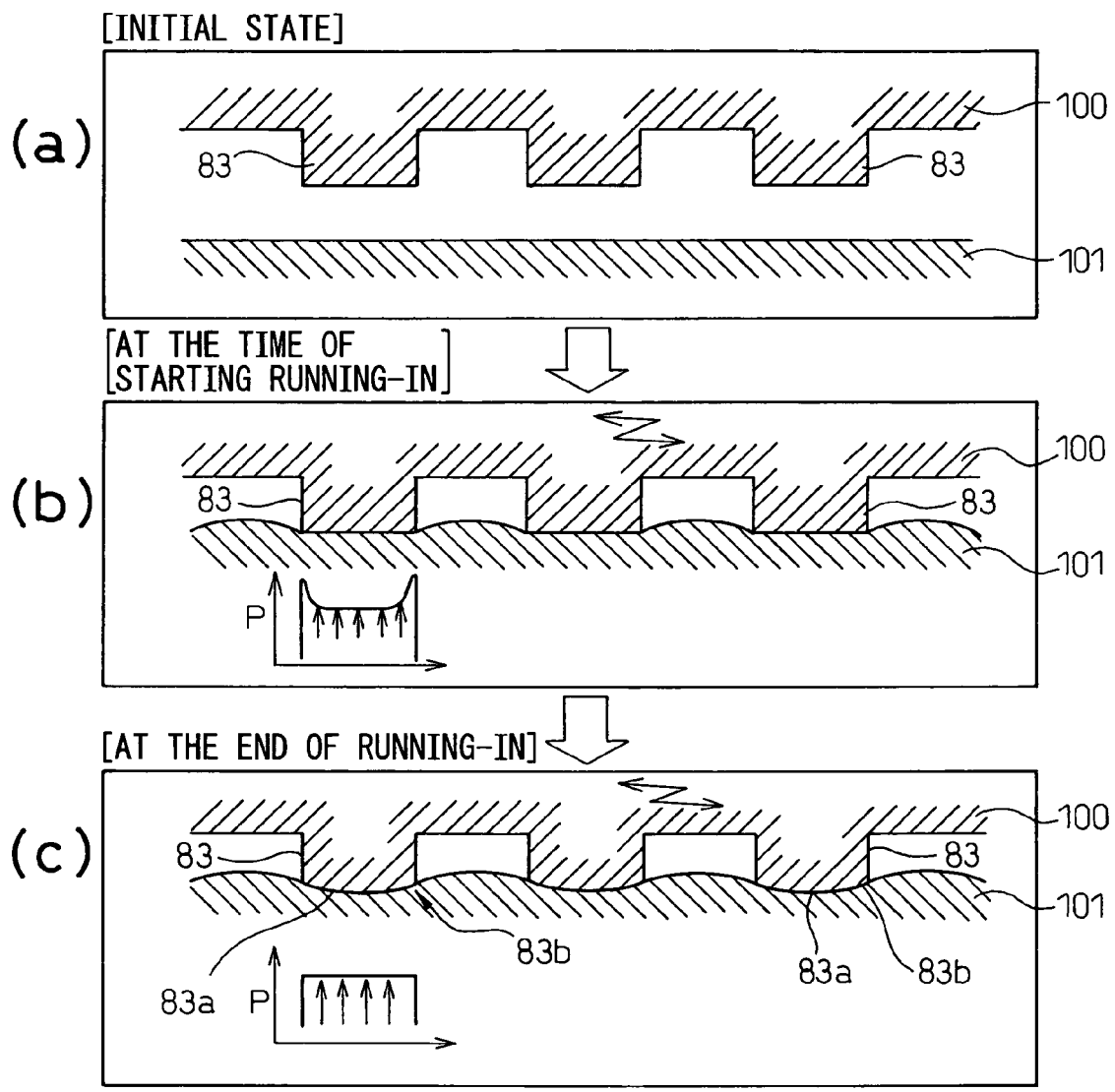

COMPRESSOR WITH THRUST BEARING HAVING INSULAR PRESSURE-RECEIVING PORTIONS ON SLIDING SURFACE AND DIAMOND-LIKE CARBON LAYER ON ANOTHER SLIDING SURFACE

The Applicant claims the right to priority based on Japanese Patent Application No. 2007-133689 filed on May 21, 2007, the entire content of which being hereby incorporated by reference.

BACKGROUND OF THE INVENTION

1. Field of the Invention

This invention relates to a compressor, or in particular, to a compressor having a thrust bearing.

2. Description of the Related Art

The conventional compressors of various types are used. The scroll compressor used for the refrigeration cycle is an example.

Generally, a scroll compressor includes a fixed scroll fixed to a housing and a movable scroll arranged in opposed relation to the fixed scroll and adapted to revolve on a rotary shaft with respect to the fixed scroll, so that a fluid is compressed by the fixed scroll and the movable scroll. The movable scroll receives the force in thrust direction due to the pressure difference between the pressure on the back of the movable scroll and the pressure of the fluid compressed. This force in thrust direction is supported by a thrust bearing.

The movable scroll orbits. In the case where the thrust bearing is used for the scroll compressor, therefore, the sliding speed is lower than in the case where the thrust bearing is used for a rotary device. For this reason, the oil film of the lubricating oil is difficult to form on the sliding surfaces, and a seizure is liable to occur.

In a compressor used in the refrigeration cycle in which carbon dioxide is the refrigerant, the pressure of the refrigerant compressed is so high that the force in thrust direction increases, and how to form an oil film on the sliding surfaces of the thrust bearing poses a more critical problem.

Japanese Patent Publication (A) No. 2001-115959, for example, proposes a scroll compressor including a thrust bearing having a sliding surface of a movable scroll and a fixed sliding surface, and a back pressure mechanism for reducing the load on the sliding surfaces by exerting pressure on the rear portion of the shaft of the movable scroll, wherein the sliding surfaces are covered with a diamond-like carbon layer.

This back pressure mechanism, however, is complicated in control operation and increases the cost. The absence of the back pressure mechanism to reduce the fabrication cost, on the other hand, may increase the wear of the thrust bearing and cause a seizure.

SUMMARY OF THE INVENTION

The object of this invention is to solve the problem point described above and provide a compressor low in fabrication cost, which includes a thrust bearing high in the ability to prevent the seizure and small in the wear amount of the bearing sliding surfaces under various operating conditions.

In order to solve the problem and achieve the object described above, according to one aspect of the invention, there is provided a compressor comprising a thrust bearing (53) including a first sliding surface (100) and a second sliding surface (101) in opposed relation to the first sliding surface (100), wherein the first sliding surface (100) is formed with a plurality of insular pressure-receiving portions (83) surrounded by grooves (85) independently of each other, wherein the second sliding surface (101) is flat as compared with the first sliding surface (100) and formed with a diamond-like carbon layer (101a).

As a result, the wear or seizure on the sliding surfaces of the thrust bearing (53) is prevented. Also, the sliding action between the first sliding surface (100) and the second sliding surface (101) causes the adaptation of the pressure-receiving portions (83) and easily generates a fluid lubricity on the sliding surfaces, thereby further preventing the wear or seizure of the thrust bearing (53). Thus, the back pressure mechanism is eliminated, and therefore, the fabrication cost of the compressor is reduced. Also, since the running-in generates the adaptation of the pressure-receiving portions (83), the pressure-receiving portions (83) are not required to be shaped accurately in advance, thereby further reducing the fabrication cost of the compressor.

The second sliding surface (101) formed with the diamond-like carbon layer (101a) includes a base member (101b) lower in cost than the material of the first sliding surface (100). Thus, the fabrication cost of the compressor is reduced even further.

According to a second aspect of the invention, there is provided a compressor, wherein the pressure-receiving portions (83) may be substantially circular, oblong, elliptic, triangular or in the shape of any other polygon having more sides, and a plurality of the pressure-receiving portions (83) are desirably arranged in staggered fashion.

As a result, the pressure-receiving portions (83) can be arranged with a higher density, and a larger oil film can be formed per unit area to support a heavy load.

According to a third aspect of the invention, there is provided a compressor, wherein the maximum roughness of the second sliding surface (101) is desirably smaller than that of the front surface of the pressure-receiving portions (83).

As a result, the smoothness of the second sliding surface (101) is guaranteed, and therefore, the wear or seizure of the thrust bearing (53) can be positively prevented.

According to a fourth aspect of the invention, there is provided a compressor comprising a fixed scroll (38) and a movable scroll (32) for compressing the fluid by revolving with respect to the fixed scroll (38) on the rotary shaft (21), wherein the thrust bearing (53) desirably receives the axial force received by the movable scroll (32).

According to a fifth aspect of the invention, there is provided a compressor, wherein the fluid contains carbon dioxide, and the pressure of the fluid discharged exceeds the critical pressure of carbon dioxide.

According to a sixth aspect of the invention, there is provided a compressor, wherein the base member (101b) of the second sliding surface (101) is desirably formed of the alloy steel for mechanical construction or the rolled steel plate.

Thus, the fabrication cost of the compressor is further reduced.

According to a seventh aspect of the invention, there is provided a compressor, wherein the second sliding surface (101) is formed with an intermediate layer (101c) between the base member (101b) of the second sliding surface (101) and the diamond-like carbon layer (101a), and wherein the intermediate layer (101c) is desirably formed of one or a plurality of materials including chromium, aluminum, tungsten, tantalum, molybdenum, niobium, carbon and titanium.

As a result, the adherence between the base member (101b) of the second sliding surface (101) and the diamond-like carbon layer (101a) is improved.

The reference numerals inserted in the parentheses following the names of the respective structure described above represent an example of correspondence with the specific structure of the embodiments described below.

BRIEF DESCRIPTION OF THE DRAWINGS

These and other features and advantages of the present invention will be better understood by reading the following detailed description taken together with the accompanying drawings, wherein:

FIG. 1 is a longitudinal sectional view showing a scroll compressor according to an embodiment of the invention;

FIG. 3 is a diagram showing the manner in which an oil film is formed in the insular pressure-receiving portions of the movable-side sliding surface shown in FIG. 2 and the pressure thereof;

FIG. 6($a$) is a schematic diagram showing the initial state of the pressure-receiving portions before the running-in, ($b$) a schematic diagram showing the state of the pressure-receiving portions at the time of starting the running-in, and ($c$) a schematic diagram showing the state of the pressure-receiving portions at the end of the running-in;

FIG. 9A is a diagram showing the shape of the pressure-receiving portions before the running-in;

FIG. 9B is a diagram showing the shape of the pressure-receiving portions after the running-in;

DETAILED DESCRIPTION OF THE INVENTION

Figure 2A:
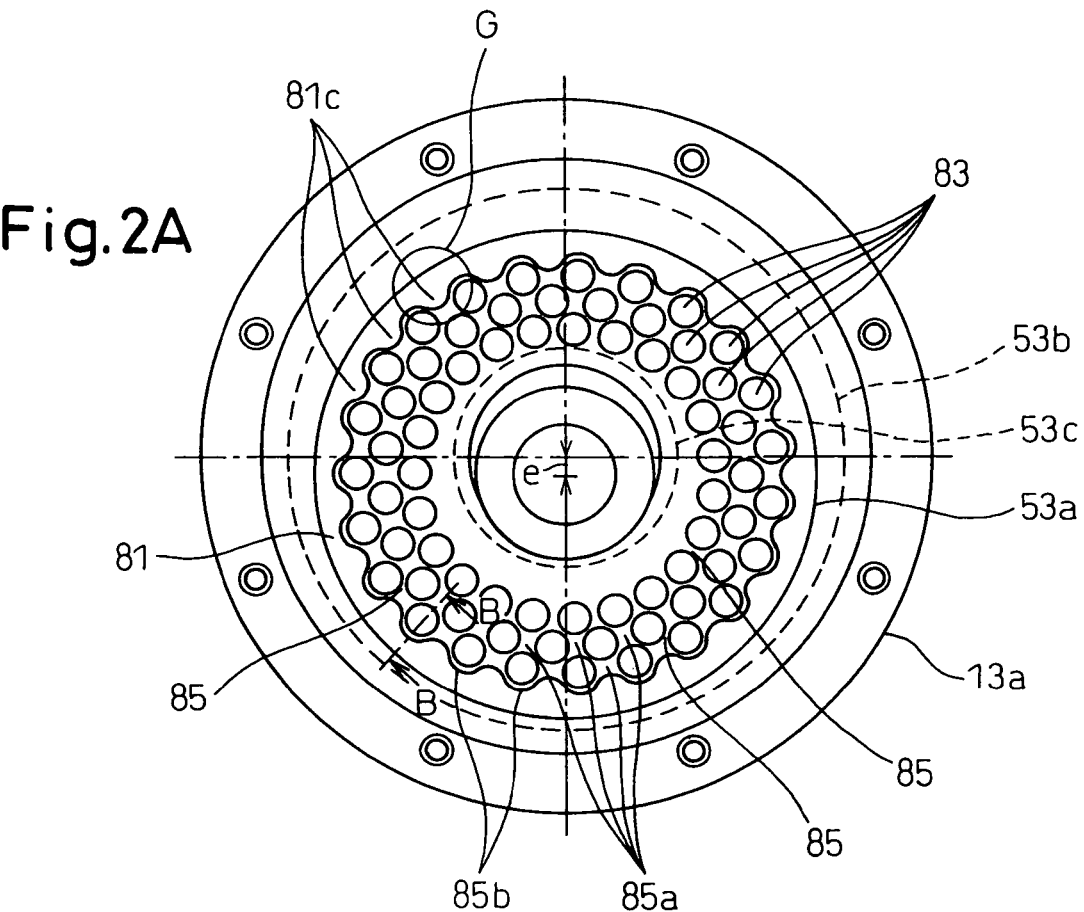
FIG. 2A is a diagram showing a movable-side sliding surface of the thrust bearing of the scroll compressor shown in FIG. 1.

An embodiment of the invention is explained below with reference to the accompanying drawings.

However, note that the present invention is not limited by the following explanation and that it extends to the aspects of the invention described in the claims and their equivalents.

FIG. 1 is a longitudinal sectional view showing a scroll compressor 11 according to this embodiment. This embodiment represents an example of a compressor for a water heater, which is used in the refrigeration circuit with carbon dioxide as a refrigerant and in which the pressure of carbon dioxide discharged exceeds the critical pressure. Nevertheless, the invention is not limited to this compressor.

The scroll compressor 11 according to this embodiment is a motor-driven hermetic compressor having a closed container 13 accommodating a motor unit 27 and a compression mechanism 10.

The closed container 13 includes a cylindrical case 13$a$, a motor-side end case 13$b$ assembled at each end of the cylindrical case 13$a$ and a compression mechanism-side end case 13$c$.

The motor unit 27 includes a stator 25 fixed on the inner peripheral surface of the cylindrical case 13$a$ and a rotor 23 fixed on the shaft 21 rotationally driven by the motor unit 27.

The compression mechanism 10 includes a middle housing 15 fixed at a position adjacent to the stator 25 in the cylindrical case 13$a$, a movable scroll 32 orbited by a crank mechanism 28 supported by a main bearing 17 arranged on the middle housing 15, and a fixed scroll 38 fixed on the cylindrical case 13$a$ on the side of the middle housing 15 far from the stator 25 in opposed relation to the movable scroll 32 thereby to form a working chamber 45 described later.

The shaft 21 is supported substantially horizontally by the main bearing 17 and an auxiliary bearing 19 fixed on a discal support member 14 interposed between the stator 25 and the motor-side end case 13$b$ in the cylindrical case 13$a$.

The movable scroll 32 includes a substantially discal movable-side plate 33, a movable-side spiral 41 erected in an involute curve toward the fixed scroll 38 from the end surface of the movable-side plate 33 and a boss 35 erected cylindrically toward the middle housing 15 from the end surface far from the movable-side spiral 41.

The fixed scroll 38 includes a fixed-side plate 39 fixed on the cylindrical case 13$a$ and a fixed-side spiral 43 formed of a spiral groove arranged on the end surface of the fixed-side plate 39 nearer to the movable scroll 32.

The middle housing 15 assumes the form of a triple-step cylinder having a progressively larger diameter toward the fixed scroll 38 from the motor unit 27. The cylinder 15$a$ having the smallest diameter near to the motor unit 27 makes up the main bearing 17, and the middle cylinder 15$b$ makes up a crank chamber 29 for accommodating the crank mechanism 28. The cylinder 15$c$ having the largest diameter near to the fixed scroll 38, on the other hand, forms a scroll housing 31 for accommodating the movable scroll 32 therein and is fixed on the inner peripheral surface of the cylindrical case 13$a$ by a fixing means such as welding.

The crank mechanism 28 is configured of an eccentric shaft 37 arranged integrally at the end of the shaft 21 nearer to the compression mechanism 10 and the boss 35 of the movable scroll 32. The eccentric shaft 37 is decentered a predetermined amount e (FIG. 2A) from the axial center of the main bearing 17 and the auxiliary bearing 19. This eccentricity amount e makes up the orbiting radius of the movable scroll 32.

An Oldham coupling not shown is arranged on the end surface (hereinafter referred to as the disk-unit scroll-side end surface 15$e$) of the disk unit 15$d$, nearer to the movable scroll 32, connecting the large-diameter cylinder 15$c$ and the middle cylinder 15$b$ making up the middle housing 15 thereby to prevent the rotation of the movable scroll 32. As a result, the movable scroll 32 is permitted only to orbit. In the compression mechanism 10, the volume of a plurality of the working chambers 45 formed by the movable-side spiral 41 and the fixed-side spiral 43 in mesh with each other is reduced by the revolution of the movable scroll 32 with respect to the fixed scroll 38 thereby to compress the refrigerant supplied to the intake chamber 46 communicating with the outermost periphery of the fixed-side spiral 43.

Also, a thrust bearing 53 is arranged between the disk-unit scroll-side end surface 15$e$ and the end surface of the movable scroll 32 formed with the boss 35 (hereinafter referred to as the movable-scroll back surface 32$a$). This thrust bearing 53 is a slide bearing for sliding between the movable-scroll back surface 32a and the disk-unit scroll-side end surface 15e under the axial force (in this embodiment, the force pushing the movable-side plate 33 from the fixed scroll 38 toward the disk unit 15d) received by the movable-side plate 33 due to the difference between the compression reaction generated at the time of compression of the refrigerant and the force generated in thrust direction by the pressure of the movable-scroll back surface 32a. This thrust bearing 53 is explained in detail later.

The intake chamber 46 is arranged on the side surface of the fixed-side plate 39 and connected with an intake tube 47 for introducing the refrigerant from the refrigerant circuit external to the closed container 13 through the cylindrical case 13a.

A discharge port 49 is formed axially through the fixed-side plate 39 at the central portion of the fixed-side spiral 43. The refrigerant compressed by the movable scroll 32 and the fixed scroll 38 is discharged into a discharge chamber 50 from the discharge port 49.

The discharge chamber 50 is configured of a depression formed by the end surface (hereinafter referred to as the fixed-scroll back surface 38a) on the side of the fixed-side plate 39 far from the movable scroll 32 and the end surface of the separator block 55, nearer to the fixed-side plate 39, fixed on the fixed-scroll back surface 38a. Incidentally, the discharge chamber 50 has therein a discharge valve 61 for preventing the reverse flow of the refrigerant discharged.

The high-temperature high-pressure refrigerant discharged into the discharge chamber 50 is led to an oil separator 63 through a refrigerant path 57 extending upward from the discharge chamber 50.

The oil separator 63 is of centrifugal double-cylinder type and includes an inner cylinder 63a and an outer cylinder 63b.

The refrigerant path 57, after extending upward along the fixed-scroll back surface 38a from the discharge chamber 50, is connected, substantially tangentially, to the space between the inner cylinder 63a and the outer cylinder 63b of the centrifugal oil separator 63. The refrigerant flowing into the space between the inner cylinder 63a and the outer cylinder 63b substantially in tangential direction revolves in the space between the inner cylinder 63a and the outer cylinder 63b. After the oil contained in the refrigerant is centrifugally separated, the refrigerant is sent to the refrigerant circuit external to the closed container 13 through the inner cylinder 63a and the discharge tube 59. The oil according to this embodiment preferably contains, as a main component, a lubricating oil composed of selected one of polyalkylene glycol, polyvinyl ether and polyol ester or a mixture of any ones thereof.

Incidentally, the outer cylinder 63b of the oil separator 63 is configured of a cylindrical hole formed in the separator block 55, and the inner cylinder 63a is fixed by a fixing means such as pressure fitting or a circlip into the cylindrical hole making up the outer cylinder 63b.

Also, the discharge pipe 59 is hermetically inserted into the upper end of the cylindrical hole making up the outer cylinder 63b through the interior and exterior of the closed container 13. Incidentally, the space between the separator block 55 and the compression mechanism-side end case 13c constitutes an atmosphere lower in pressure than the refrigerant discharged.

The oil separated by the oil separator 63 moves downward by gravitation along the inner wall surface of the outer cylinder 63b, and is stored in a high-pressure oil storage 65 through a small-diameter hole 64 formed at the lower end of the cylindrical hole of the outer cylinder 63b.

The high-pressure oil storage 65 is arranged in the separator block 55, and located under the cylindrical hole making up the outer cylinder 63b and the discharge chamber 50. In order to increase the amount of the high-pressure oil that can be stored in the high-pressure oil storage 65, the separator block 55 is so configured that the lower portion thereof making up the high-pressure oil storage 65 is projected toward the compression mechanism-side case 13c more than the upper portion thereof corresponding to the cylindrical hole making up the outer cylinder 63b.

The oil stored in the high-pressure oil storage 65 is led to the oil path 69 in the movable-side plate 33 by way of the oil return path 67 through the fixed-side plate 39 under the fixed-side spiral 43. Incidentally, a small-diameter diaphragm 67a is arranged at the outlet of the oil return path 67.

The inlet of the oil path 69 opens to the surface of the movable-side plate 33 having the movable-side spiral 41. The inlet of the oil path 69 is adapted to communicate intermittently with the outlet of the oil return path 67 by the orbiting motion of the movable scroll 32. Also, the outlet of the oil path 69 is open to the inner wall of the boss 35 to communicate with the space between the end portion of the shaft 21 and the bottom surface of the boss 35.

Incidentally, the oil stored in the high-pressure oil storage 65, though high in pressure due to the discharge pressure of the refrigerant, is reduced to the desired pressure level by the intermittent communication between the oil return path 67 and the oil path 69 due to the orbiting motion of the movable scroll 32 and the diaphragm 67a.

The oil led to the space between the end portion of the shaft 21 and the bottom surface of the boss 35 flows into the oil path 71 formed axially through the shaft 21.

The oil that has passed through the oil path 71 is led between the motor-side end case 13b and the support member 14 in the closed container 13. The support member 14, the middle housing 15 and the fixed-side plate 39 have a gap, not shown, with the cylindrical case 13a. The oil that has been led between the motor-side end case 13b and the support member 14, therefore, is stored over the entire inner lower part of the closed container 13. The entire inner lower part of the closed container 13 makes up a low-pressure oil storage 66.

The oil stored in the low-pressure oil storage 66 reaches the scroll housing 31 through the oil return hole 73 formed in the lower part of the disk unit 15d of the middle housing 15.

The oil path 71 has arranged therein diametrical holes 71a, 71b branching from the oil path 71 at the parts thereof corresponding to the main bearing 17 and the auxiliary bearing 19.

The outlet of the diametrical hole 71a communicates with the shaft groove 21a arranged on the shaft 21, and the oil that has flowed into the diametrical hole 71a, after lubricating the main bearing 17, the crank mechanism 28 and the thrust bearing 53, reaches the scroll housing 31. An oil groove 72 for establishing communication between the diametrical hole 71a and the thrust bearing 53 is formed on the middle cylinder 15b above the shaft 21 to lead the oil to the thrust bearing 53 above the shaft 21.

The oil that has flowed into the diametrical hole 71b, on the other hand, after lubricating the auxiliary bearing 19, drops into the low-pressure oil storage 66 and reaches the scroll housing 31 through the oil return hole 73.

The oil return path 67, the oil paths 69, 71 and the diametrical hole 71a make up an oil supply means for supplying the oil to the thrust bearing 53 due to the pressure difference between the oil separated by the oil separator 63 and the portion where the thrust bearing 53 is arranged.

The oil that has reached the scroll housing 31 is supplied to the sliding surfaces of the movable scroll 32 and the fixed scroll 38, compressed together with the refrigerant in the working chamber 45, and separated again from the refrigerant by the oil separator 63.

Next, the thrust bearing 53 according to the invention will be explained. The thrust bearing 53 according to the invention is configured of a scroll-side plate 53a fixed on the movable-scroll back surface 32a and a housing-side plate 53b fixed on the disk-unit scroll-side end surface 15e.

The scroll-side plate 53a is formed in the shape of a donut, of which the boss 35 is passed through the central hole. The end surface of the scroll-side plate 53a in sliding contact with the housing-side plate 53b is formed with a substantially circular uneven portion as shown in FIGS. 2A and 2B.

Figure 2B:
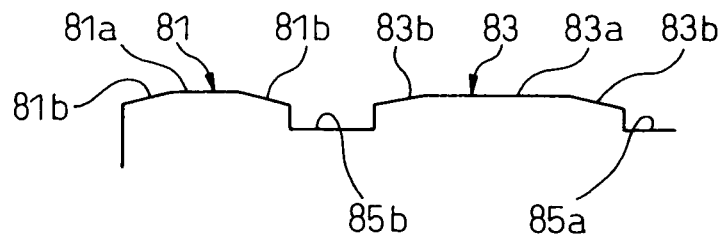
FIG. 2B is an enlarged sectional view taken in line B-B in FIG. 2A.
Figure 2C:
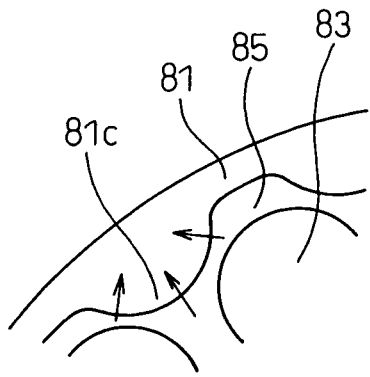
FIG. 2C is an enlarged view of the area G shown in FIG. 2A.

FIG. 2A is a sectional view taken in line A-A in FIG. 1 in such a manner that the end surface of the scroll-side plate 53a in sliding contact with the housing-side plate 53b is visible, FIG. 2B a sectional view taken in line B-B in FIG. 2A in such a manner that the substantially circular uneven section is visible, and FIG. 2C an enlarged view of the portion designated by reference character G in FIG. 2A. In FIG. 2A, the housing-side plate 53b indicated by dashed line and the inner edge 53c of the housing-side plate 53b, though not visible in the sectional view of FIG. 2A, are shown at the corresponding positions in FIG. 2A to indicate the relative positions thereof with the housing-side plate 53b.

The substantially circular uneven depression is configured of a plurality of grooves 85. The plurality of the grooves 85, supplied with the oil by the oil supply means described above, cross each other in meshes with the intersections 85a thereof wider than the other groove portions. Also, the bottom surface of the grooves 85 shown in FIG. 2B has the surface roughness of not less than 12.5 Rz larger than that of the pressure-receiving portions 83 described later. Of all the plurality of the grooves 85, the grooves located on the outermost periphery (hereinafter referred to as the outermost peripheral grooves) 85b are formed in zigzag around and along the whole edge of the scroll-side plate 53a. Between the outermost peripheral grooves 85b and the edge of the scroll-side plate 53a, an outer peripheral seal portion 81 is formed which is constantly in sliding contact with the housing-side plate 53b along the whole periphery thereby to reduce the amount of the lubricating oil flowing out from the sliding surfaces. The seal portion 81 has a protruded portion 81c so curved as to expand diametrically inward of the scroll-side plate 53a by the zigzag form of the outermost peripheral grooves 85b. The protruded portion 81c, like the pressure-receiving portions 83 described later and as shown in FIG. 2c, plays the role of pulling in the oil from all the directions faced by the protruded portions 81c by the revolution of the movable scroll 32 thereby to form an oil film.

The protruded portion surrounded by the plurality of the grooves 85 between the grooves 85 constitutes insular pressure-receiving portions 83, which are formed substantially circular and arranged in staggered fashion in harmony with the zigzag of the outermost peripheral groove 85. The diameter of each pressure-receiving portion 83 is desirably not less than e but less than 2e where e is the orbiting radius of the movable scroll 32 and the area ratio of the pressure-receiving portions 83 with respect to the grooves 85 on the sliding surfaces is desirably not less than 50% in order to secure the ability to exclude foreign matter and reduce the contact pressure. Also, the upper surface of the seal portion 81 and the pressure-receiving portions 83 are located substantially flush with each other as smooth sliding surfaces. As shown in FIG. 2B, tapered portions or sagged portions 81b, 83b to produce the wedge effect of the oil film are formed on the edge of the seal portion 81 and the pressure-receiving portion 83, and the housing-side plate 53b is in sliding contact with the flat portions 81a, 83a.

Also, according to this embodiment, the thrust bearing 53 has an uneven scroll-side plate 53a fixed on the movable scroll 32, and therefore, the plurality of the grooves 85 forming the uneven portion are moved relatively to the shaft 21 with the revolution of the movable scroll 32.

In the housing-side plate 53b, the surface in sliding contact with the scroll-side plate 53a is mirror-finished as a plane flat surface. The housing-side plate 53b thus assumes a donut-like form similar to the scroll-side plate 53a.

With this configuration, the oil held in the grooves 85 forms an oil film 86, as shown in FIG. 3, on the pressure-receiving portions 83 due to the wedge effect of the sagged portions and the tapered portions 81b, 83b formed around each pressure-receiving portion as the result of the sliding contact between the scroll-side plate 53a and the housing-side plate 53b. This oil film 86 is the refrigerant dissolved in the lubricating oil.

Next, the thrust bearing 53 according to this embodiment will be explained in more detail below.

Figure 4:
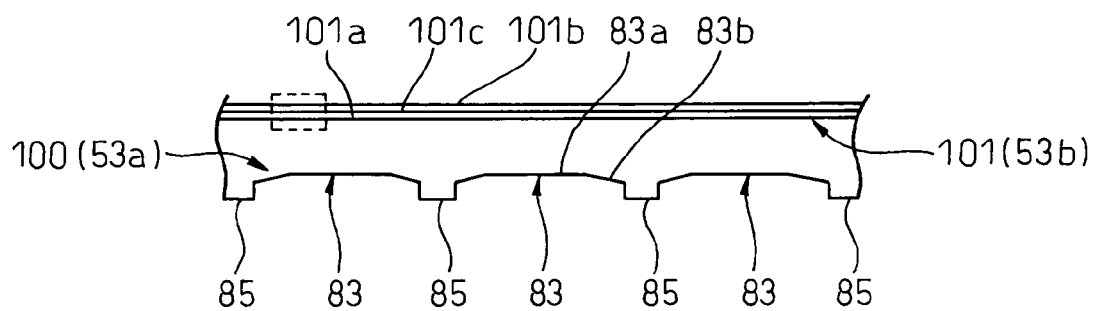
FIG. 4 is a schematic diagram showing, in enlarged form, the essential parts of the sliding surface of the thrust bearing.

The thrust bearing 53, as shown in FIG. 4, has a pair of sliding surfaces 100, 101. The first sliding surface 100 constitutes a surface of the scroll-side plate 53a in opposed relation to the housing-side plate 53b. The second sliding surface 101 makes up a surface of the housing-side plate 53b in opposed relation to the scroll-side plate 53a.

According to this embodiment, the scroll-side plate 53a having the first sliding surface 100 is formed as a part separate from the movable scroll 32, but may alternatively be formed as a part integrated therewith.

As described above, the first sliding surface 100, as shown in FIG. 2A, is formed with a multiplicity of insular pressure-receiving portions 83. The second sliding surface 101, on the other hand, as shown in FIG. 4, has a substantially flat portion in opposed relation to the pressure-receiving portions 83 of the first sliding surface 100. According to this embodiment, the second sliding surface 101 forms a flat plane surface as a whole.

As described above, the pressure-receiving portions 83 are each substantially circular, and a plurality of the insular pressure-receiving portions 83 are surrounded by the grooves 85 and arranged in staggered fashion independently of each other on the scroll-side plate 53a.

In FIG. 4, the grooves 85 may be replaced with other grooves 85a, 85b.

In this specification, the "substantially flat" should be interpreted to be flat to such an extent as to generate the pressure due to the wedge effect in the mixed fluid of the lubricating oil and the refrigerant interposed between the pressure-receiving portions 83 and the second sliding surface 101.

As shown in FIG. 4, the pressure-receiving portions 83 each have a sagged portion 83b formed on the peripheral edge thereof and a flat portion 83a connected to the sagged portion 83b on the inside of the sagged portion 83b. The sagged portion 83b is formed on the peripheral edge of the pressure-receiving portion 83 into which the mixed fluid flows. According to this embodiment, the revolving motion of the movable scroll 32 pulls in the mixed fluid from the whole peripheral edge of the pressure-receiving portion 83, and therefore, the sagged portion 83b is formed along the whole peripheral edge of the pressure-receiving portion 83.

The sagged portion 83b, having a substantially constant width, is formed annular along the peripheral edge of each pressure-receiving portion 83. The flat portion 83a located inside the annular sagged portion 83b is circular.

The sagged portion 83b either may be curved in convex form toward the second sliding surface 101 or may have a flat surface.

The first sliding surface 100 and the second sliding surface 101 easily produce the fluid lubricity due to the wedge effect of the pressure-receiving portions 83.

As to the height of the pressure-receiving portions 83, the length between the flat portion 83a and the groove 85 as measured in the direction perpendicular to the flat portion 83a is desirably 0.1 to 0.5 mm to generate the oil film effectively while at the same time discharging foreign matter and securing the load resistance at the pressure-receiving portions 83. According to this embodiment, the grooves 85, 85a, 85b are formed at the same height.

As to the height difference between the flat portion 83a and the outer peripheral edge of the sagged portion 83b, on the other hand, the length measured in the direction perpendicular to the flat portion 83a is desirably 0.5 to 5 µm for the same reason. This is also the case with the sizes of the seal portion 81, the flat portion 81a and the sagged portion 81b thereof.

The thrust bearing 53 having the first sliding surface 100 and the second sliding surface 101 assumes the fluid lubricity under predetermined operating conditions due to the wedge effect in the pressure-receiving portions 83.

Next, the fluid lubricity of the thrust bearing 53 is explained in more detail below.

In the fluid lubricated state, a continuous oil film of the mixed fluid is formed between the first sliding surface 100 and the second sliding surface 101. Therefore, the first sliding surface 100 and the second sliding surface 101 are separated from each other by the oil film. In other words, the sliding surfaces 100 and 101 are out of contact with each other.

In order to secure the fluid lubricity on the sliding surfaces of the thrust bearing 53, what is called the oil film parameter $\Lambda$ desirably meets the relation $\Lambda \geqq 3$.

The oil film parameter is the ratio between the minimum oil film thickness and the composite surface roughness. The minimum oil film thickness is given as the thickness of the oil film at the part where the length between the pressure-receiving portion 83 and the second sliding surface 101 is shortest. Specifically, the part where the oil film thickness is smallest is the flat portion 83a.

The composite surface roughness, on the other hand, is equal to the value obtained by taking the square root of the square sum of the standard deviations of the surface roughness of the sliding surfaces 100, 101.

Once the oil film parameter $\Lambda$ meets the relation $\Lambda \geqq 3$, the minimum oil film thickness becomes sufficiently larger than the composite surface roughness. Between the pressure-receiving portions 83 and the second sliding surface 101, therefore, the oil film constantly exists and the two sliding surfaces 100, 101 are separated from each other. In other words, the fluid lubricity of the thrust bearing 53 is achieved.

As described above, the sagged portions 83b are desirably formed uniformly and accurately on the pressure-receiving portions 83 to achieve the fluid lubricity of the thrust bearing 53.

Figure 5:
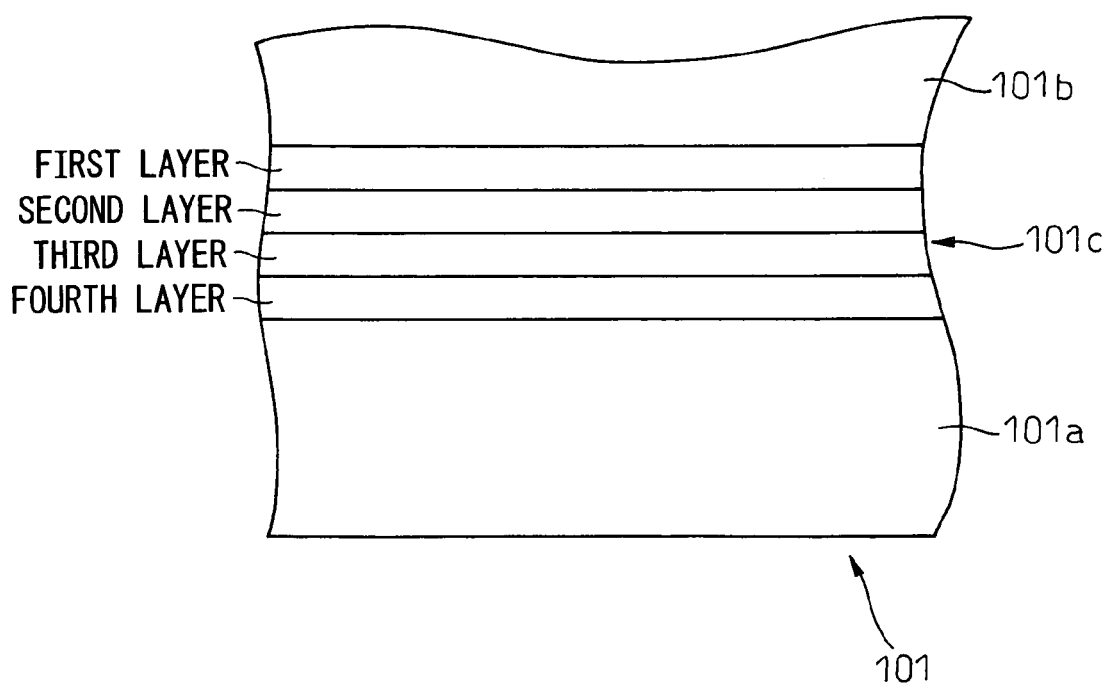
FIG. 5 is an enlarged view of the essential parts of the fixed-side sliding surface shown in FIG. 4.

Also, according to this embodiment, the uppermost front surface of the second sliding surface 101 is formed with a diamond-like carbon layer 101a as shown in FIGS. 4 and 5. The diamond-like carbon layer 101a is high in hardness, chemical stability, lubricity, wear resistance and seizure resistance. FIG. 5 is a diagram showing, in enlarged form, the front surface portion of the second sliding surface 101 defined by a square in FIG. 4.

As described above, the second sliding surface 101 is covered by the diamond-like carbon layer 101a, and therefore, the wear and seizure are prevented even in the case where the thrust bearing 53 is in the state of boundary lubrication or mixed lubrication.

The thickness of the diamond-like carbon layer 101a is desirably 1 to 10 µm or, especially, 1 to 3 µm. The thickness of not less than 1 µm prevents the wear and seizure between the second sliding surface 101 and the first sliding surface 100. Also, the thickness of not more than 10 µm can suppress the fabrication cost of the diamond-like carbon layer 101a.

Also, the front surface of the base member 101b of the second sliding surface 101 before forming the diamond-like carbon layer 101a is desirably smooth. Specifically, the maximum surface roughness of the second sliding surface 101 is desirably smaller than the maximum roughness of the front surface of the pressure-receiving portions 83. The maximum roughness of the front surface of the pressure-receiving portions 83 is equal to the maximum surface roughness of the flat portion 83a. Also, as described later, before the running-in with no sagged portion 83b formed on the pressure-receiving portions 83, the maximum roughness of the front surface of the pressure-receiving portions 83 is defined to be equal to the maximum surface roughness of the flat portion of the particular pressure-receiving portions 83.

For this reason, according to this embodiment, the maximum surface roughness of the base member 101b is not more than 0.4 µm, or especially, not more than 0.2 µm. In the case where the maximum roughness of the base member 101b is larger than 0.4 µm, the diamond-like carbon layer 101a on the base member 101b is formed with an unevenness corresponding to the surface roughness, with the result that the first sliding surface 100 would be worn at the time of sliding.

The base member 101b can be processed into the maximum surface roughness described above by lapping or barreling.

Also, the second sliding surface 101 is formed with an intermediate layer 101c between the base member 101b of the second sliding surface 101 and the diamond-like carbon layer 101a thereby to increase the adherence between the base member 101b and the diamond-like carbon layer 101a. As described in more detail later, the base member 101b is formed of steel, and a material high in adherence with the steel is desirably used for the intermediate layer 101c.

Specifically, the intermediate layer 101c is preferably formed of one or a plurality of the materials selected from chromium, aluminum, tungsten, tantalum, molybdenum, niobium, carbon and titanium.

The intermediate layer 101c, as shown in FIG. 5, has a laminated structure including first, second, third and fourth layers in that order as viewed from the base member 101b.

In the intermediate layer 101c, a layer (first layer) formed of a metal such as chromium and/or aluminum making up a base member 101b-side layer has so high an affinity for the steel of the base member 101b as to exhibit a high adherence with the steel member. The interposition of this base member 101b-side layer (the first layer described above) can secure the adherence between the base member 101b and the intermediate layer 101c (first layer).

The diamond-like carbon layer 101a is desirably amorphous to improve the adherence with the intermediate layer 101c.

The third intermediate layer is formed of at least one of the metals selected from tungsten, tantalum, molybdenum, niobium and titanium, while the second intermediate layer is a mixed material layer of the materials making up the first layer and the third layer. The interposition of these layers makes it possible to secure the adherence between the first intermediate layer and the third intermediate layer.

The second layer described above has desirably a progressively-changing composition in which the metal is reduced stepwise or continuously from the first layer (base member 101b side) toward the diamond-like carbon layer 101a (i.e. the element density of the third layer is increased from 0% to 100%). By employing this film configuration, the mechanical characteristic of the multilayer film can be changed stepwise or continuously from the base member 101b side toward the diamond-like carbon layer 101a. As a result, the peeling which otherwise might be caused by a local stress concentration such as a thermal shock is prevented.

The outermost front surface layer (the fourth layer described above) in the intermediate layer 101c is not formed of fragile carbide but an amorphous layer containing the metal making up the third layer and carbon. The amorphous layer is defined as a layer of which the crystal phase cannot be confirmed by observation under transmission electron microscope. The fourth intermediate layer containing no fine deposit eliminates the fragile part of the intermediate layer 101c and thus prevents the internal peeling or destruction. Also, the stress which may occur in the third intermediate layer due to a grating mismatch or the like is relaxed, and the adherence can be secured by use of the metal element of the same type. Further, since the diamond-like carbon layer 101a making up the outermost front surface layer is amorphous, the adherence with the amorphous mixed layer of the metal element and carbon is also improved.

The metal elements forming the adjacent layers are not necessarily identical with each other, but the effect described above is exhibited also by the adjacent layers containing different metal elements [for example, a chromium layer (first layer) and an aluminum/tungsten layer (second layer)]. Desirably, however, the adjacent layers contain the same metal element [for example, a chromium layer (first layer) and a chromium/tungsten layer (second layer)] or at least an element contained as a part of one layer is also contained also as a part of the other layer [for example, a tungsten/molybdenum layer (third layer) and a tungsten/carbon layer (fourth layer)].

The fourth layer, like the second layer, also desirably has the progressively-changing composition in which the material element such as a metal is reduced stepwise or continuously from the third layer side (base member 101b side) toward the diamond-like carbon layer 101a (front surface layer side) (i.e. the carbon density is increased from 0% to 100%). By employing this film configuration, the mechanical characteristic of the multilayer film can be changed stepwise or continuously from the base member 101b side toward the diamond-like carbon layer 101a. As a result, the peeling which otherwise might be caused by a local stress concentration such as a thermal shock is prevented. Nevertheless, an amorphous material having a constant material density (i.e. carbon density) can alternatively be employed.

In the intermediate layer 101c, a layer (the third intermediate layer) formed of at least one material selected from tungsten, tantalum, molybdenum, niobium and titanium can be replaced with a compound (for example, a cemented carbide material) having tungsten carbide (WC) as a main component. Also, in such a case, a film can be formed advantageously by using a less expensive target material than tungsten, tantalum, molybdenum, niobium or titanium.

In forming the third layer, the composition of the second and fourth intermediate layers is also controlled properly in accordance with the composition of the third layer. Also in the case where this film configuration is employed, the peeling caused by local stress concentration can be effectively prevented by forming the second and fourth layers of the composition progressively and stepwise changing toward a similar composition of the adjacent layers.

The intermediate layer 101c can be configured in any way effectively as long as a stress attenuation layer of carbon is formed between the fourth intermediate layer and the outermost front-surface diamond-like carbon layer 101a. This stress attenuation layer has a hardness almost equal to that of the third layer in the boundary with the third intermediate layer, and the hardness is increased stepwise or continuously toward the outermost front surface layer. Thus, the hardness desirably becomes almost equal to that of a film having the diamond-like carbon layer as a main layer in the neighborhood of the outermost front layer.

The thickness of the intermediate layer 101c described above is desirably 10 to 50% of the thickness of the multilayer film as a whole including the diamond-like carbon layer 101a and the intermediate layer 101c. The fact that the thickness is not less than 10% makes it possible to secure a sufficient adherence between the diamond-like carbon layer 101a and the base member 101b. The thickness of not more than 50%, on the other hand, prevents the intermediate layer 101c from being peeled off at the time of sliding while at the same time suppressing the fabrication cost of the intermediate layer 101c.

The Vickers hardness of the diamond-like carbon layer 101a is desirably not less than double that of the pressure-receiving portions 83 adapted to slide in opposed relation to the second sliding surface 101. Specifically, the Vickers hardness of the diamond-like carbon layer 101a is desirably not less than 1500 HV, and that of the pressure-receiving portions 83 in the range of 700 to 900 HV.

In view of the fact that the Vickers hardness of the diamond-like carbon layer 101a is not less than double that of the pressure-receiving portions 83, the wear and seizure of the second sliding surface 101 can be effectively prevented. Also, as described later, the running-in makes it possible to easily form the sagged portions 83b of the pressure-receiving portions 83.

Also, even in the case where the sagged portions 83b of the pressure-receiving portions 83 are not yet formed before the running-in, the fact that the diamond-like carbon layer 101a is covered on the second sliding surface 101 prevents the second sliding surface 101 from being worn or seized in mixed lubrication or boundary lubrication. Also, even during the running-in, the wear and seizure of the second sliding surface 101 are prevented.

Also, the Vickers hardness of the base member 101b of the second sliding surface 101 is desirably 700 to 900 HV to suppress the deformation of the base member 101b and thus prevent the peeling of the diamond-like carbon layer 101a from the base member 101b under a high contact pressure which may be imparted to the second sliding surface 101.

The Vickers hardness of the base member 101b and the pressure-receiving portions 83 can be set in the aforementioned range by appropriately selecting the materials thereof.

Next, a method of forming the diamond-like carbon layer 101a or the intermediate layer 101c described above is explained below.

The method of forming the diamond-like carbon layer 101a or the intermediate layer 101c includes the physical vapor deposition (PVD) method such as sputtering or ion plating and the chemical vapor deposition (CVD) method. Among these methods, the sputtering method, or especially, the unbalanced magnetron sputtering (hereinafter sometimes simply referred to as the UBM sputtering) is most desirably used.

In the UBM sputtering process, the plasma generated at the time of sputtering is dispersed to the neighborhood of the base board along the magnetic lines of force. As compared with the normal sputtering process, a dense diamond-like carbon layer high in density and hardness can be formed. Also, according to the UBM sputtering process, no carbide is formed in the intermediate layer for tungsten, tantalum, molybdenum, niobium or titanium having a high ability to form a carbide, and therefore, a uniform amorphous layer can be formed.

In fabricating the intermediate layer 101c, the second and fourth layers having the progressively-changing composition described above are formed by sputtering (desirably, the UBM sputtering) while at the same time controlling the electric power for sputtering. Also, in fabricating the intermediate layer 101c having the stress attenuation layer, the hardness of the stress attenuation layer can be changed continuously or stepwise by regulating the DC or pulse-like bias voltage applied to the base member 101b.

In the stage of forming the first to third intermediate layers in the base member 101b, the base member 101b is controlled at the temperature of 150 to 350° C., or desirably, 250 to 350° C. to promote the dispersion of the metal elements of the first intermediate layer to the base member 101b and among the different layers, resulting an improved adherence between the first layer and the base member 101b and among the first to third layers. In the case where the diamond-like carbon layer 101a (and the fourth layer containing carbon) low in heat resistance is formed, however, the base member temperature is controlled at about 300 to 100° C., or desirably about 200 to 100° C. in each stage of forming these layers.

Next, the method of forming the sagged portions 83b of the pressure-receiving portions 83 is explained.

The sagged portions 83b described above can be formed by, for example, lapping or barreling. By use of these methods, the sagged portions 83b can be easily formed uniformly and accurately along the peripheral edge of the wide groove portion between the pressure-receiving portions 83. Considerable time and labor may be required, on the other hand, to form the sagged portions 83b accurately and uniformly in the narrow groove portion between the pressure-receiving portions 83.

As described above, by forming the sagged portions 83b accurately and uniformly, a satisfactory fluid lubricity of the pressure-receiving portions 83 can be achieved due to the wedge effect.

For this reason, by use of the running-in, the sagged portions 83b can be formed both accurately and uniformly on the one hand and the production cost of the scroll compressor can be reduced advantageously on the other hand.

Next, the method of forming the sagged portions 83b by the running-in is explained in detail below with reference to (a) to (c) of FIG. 6.

As shown in FIG. 6(a), the thrust bearing 53 used for assembling the scroll compressor first includes the first sliding surface 100 having the pressure-receiving portions 83 without the sagged portions 83b. In this initial state, the pressure-receiving portions 83 are solid-cylindrical and have only a flat portion.

Next, as shown in FIG. 6(b), a load is imposed on the thrust bearing 53 thereby to bring the pressure-receiving portions 83 and the second sliding surface 101 into contact with each other. As a result, a contact pressure P is generated in the pressure-receiving portions 83 and the part of the second sliding surface 101 in opposed relation to the particular pressure-receiving portions 83, and the second sliding surface 101 is mainly deformed elastically. The contact pressure P generated in the pressure-receiving portions 83, as shown in FIG. 6(b), has a high pressure distribution along the peripheral edge of the pressure-receiving portions 83, while the contact pressure distribution in the inside area is substantially constant. The sagged portions 83b are formed, as described below, by reason of the fact that the spike-like contact pressure P is generated along the edge of the pressure-receiving portions 83 as described below. Incidentally, also the pressure-receiving portions 83, or especially along the peripheral edge thereof, though not clearly shown in FIG. 6(b), is somewhat deformed to a shape corresponding to the elastic deformation of the second sliding surface 101.

Under this condition, the first sliding surface 100, together with the movable scroll 32, is revolved with respect to the second sliding surface fixed on the middle housing 15, so that the pressure-receiving portions 83 low in hardness is mainly worn. As a result, the sagged portions 83b begin to be formed on the pressure-receiving portions 83 along the peripheral edge thereof having a high spike-like contact pressure P. The internal area of the pressure-receiving portions 83, on the other hand, where the contact pressure is low and constant, is rarely worn or, if any, worn into flat form.

Next, with the progress of wear of the sagged portions 83b, assume that a predetermined amount of the sagged portions 83b are formed on the pressure-receiving portions 83. The contact pressure P received by the pressure-receiving portions 83, as shown in FIG. 6(c), changes in a uniform distribution. Under this condition, the sagged portions 83b no longer change and the shape ceases to change. Thus, the running-in is stopped.

Also, with the running-in described above, similar sagged portions 81b are also formed on the seal portions 81.

The conditions for the running-in of the scroll compressor 11 described above are described further below.

First, the lubrication conditions in the initial stage of the running-in of the thrust bearing 53 use those of the boundary lubrication or the mixed lubrication.

Also, the contact pressure of the pressure-receiving portions 83 and the sliding speed thereof with respect to the second sliding surface 101 are desirably not more than the critical PV value. The critical PV value is defined as the product of the contact pressure at which the adhesion of the material forming the thrust bearing 53 begins to occur and the sliding speed.

Also, the running-in is desirably conducted with a fluid containing the lubricating oil supplied to the first sliding surface 100 and the second sliding surface 101.

The running-in described above can form the sagged portions 83b around the flat portions 83a of the pressure-receiving portions 83. Incidentally, the parts of the scroll compressor other than the thrust bearing 53 can be fabricated by the normal process.

Next, the materials forming the first sliding surface 100 and the base member 101b of the second sliding surface 101 will be explained below.

According to this embodiment, the first sliding surface 100 and the base member 101b of the second sliding surface 101 is formed of steel. The steel materials often used for this purpose include high carbon chromium bearing steel, alloy steel for machine construction, rolled steel plate, nickel-chromium steel, nickel-chromium-molybdenum steel, chromium steel, chromium-molybdenum steel, manganese steel for machine construction, manganese-chromium steel and various steel materials such as construction steel materials with a hardenability guaranteed as specified according to JIS.

Especially, the base member 101b of the second sliding surface 101 with the diamond-like carbon layer 101a formed thereon is desirably made of the alloy steel for machine construction or the rolled steel plate to reduce the fabrication cost.

More specifically, the high carbon chromium bearing steel preferably includes SUJ2, SUJ3 and SUJ4. Also, the carbon steel for machine construction preferably includes SCr415, SCr420, SCr440, SCM415, SCM420, SNCM420, SCM435, SCM440, SNCM630 and S10C. Also, the rolled steel plate is desirably formed of any of materials including SPCC, SPCD, SPCE, SPCEN and SK5.

From the viewpoint of reducing the fabrication cost of the compressor, the base member 101b of the second sliding surface 101 covered with the diamond-like carbon layer 101a is preferably formed of a steel material low in cost.

In order to improve the wear resistance of the first sliding surface 100, on the other hand, the first sliding surface 100 is desirably formed of a steel material higher in wear resistance than the base member 101b of the second sliding surface 101.

In order to increase the hardness of the first sliding surface 100, the steel materials described above are preferably hardened, tempered, carburized, nitrided or carbonitrided. These processes are executed according to the well-known conditions.

The carburization process includes well-known processes such as solid carburization, liquid carburization, gas carburization and vacuum carburization.

In place of the carburization process, the steel materials may be desirably subjected to the nitridation process. The nitridation process includes the well-known method using ammonia or nitride.

Further, in order to subject the steel materials to both carburization and nitridation, the carbonitridation process described above is preferably used. The carbonitridation process is executed, for example, by nitriding the steel material in the carburization atmosphere.

The process for increasing the carbon or nitrogen density in the neighborhood of the front surface of the steel material desirably increases the hardness in the neighborhood of the front surface of the particular steel material while at the same time maintaining the internal softness, thereby increasing the wear resistance and the fatigue resistance of the scroll-side plate 53a formed of the steel material.

In the scroll compressor 11 according to this embodiment described above, the wear and seizure of the sliding surfaces of the thrust bearing 53 can be prevented by forming the diamond-like carbon layer 101a on the outermost front surface of the second sliding surface 101. Also, this configuration eliminates the need of a back pressure mechanism and therefore reduces the fabrication cost of the scroll compressor.

Also, the sliding operation of the first sliding surface 100 and the second sliding surface 101 generates the adaptation of the pressure-receiving portions 83 and therefore easily forms the fluid lubricity of the sliding surfaces. Thus, the thrust bearing 53 is prevented from being worn or seized. Specifically, the sagged portions 83b of the pressure-receiving portions 83 are formed more accurately and uniformly by the running-in of the scroll compressor 11. In the thrust bearing 53 including the pressure-receiving portions 83 having the sagged portions 83b and the flat portions 83a and the second sliding surface 101 arranged in opposed relation thereto, an oil film due to the wedge effect is formed to achieve the fluid lubricity at the time of the slide operation.

As described above, the running-in generates the adaptation of the pressure-receiving portions 83. Therefore, the sagged portions 83b are not required to be formed in advance, or if any, not required to be formed accurately and uniformly, thereby reducing the fabrication cost of the scroll compressor.

Also, a plurality of the grooves 85 are formed in meshes and the pressure-receiving portions 83 surrounded by the grooves 85 as insular portions. Thus, the pressure-receiving portions 83 are each surrounded by the grooves over the entire periphery thereof, so that the oil film 86 due to the wedge effect can be formed from all the directions by the revolution of the movable scroll 32. Further, the plurality of the grooves 85 in meshes are larger in width at the intersections 85a than in the remaining portions, and therefore, the oil can be supplied sufficiently to all the plurality of the grooves 85.

Also, the pressure-receiving portions 83, which are substantially circular and insular and have a staggered form, can be arranged with high density, so that the oil film-forming size per unit area can be increased and a heavy load can be supported.

The scroll compressor 11 according to the embodiment described above can be used under various operating conditions corresponding to particular applications. Especially, in order to secure the endurance of the scroll compressor 11, the thrust bearing 53 is desirably used exclusively in the place lubricated for a fluid.

From the viewpoints described above, the scroll compressor 11 is operated under the conditions that the sliding surfaces 100, 101 of the thrust bearing 53 are supplied with a mixed fluid containing the lubricating oil and the refrigerant, the sliding speed of the pressure-receiving portions 83 with respect to the second sliding surface 101 is set to not less than 0.5 m/sec, a load in terms of the average contact pressure of 0.5 to 20 MPa is imposed on the pressure-receiving portions 83, and the kinematic viscosity of the mixed fluid in operation is 0.1 to 10 cst. The lubricating oil is desirably contained in the oil described above.

The operating conditions of the scroll compressor 11 are further explained. In the scroll compressor 11, the mixed fluid is supplied to the sliding surfaces 100, 101 of the thrust bearing 53 by the oil supply means described above.

Also, with the orbiting motion of the movable scroll 32, the first sliding surface 100 fixed on the movable scroll 32 slides with respect to the second sliding surface 101 fixed on the middle housing 15. This sliding speed is not less than 0.5 m/sec, or preferably, 0.6 to 5 m/sec with respect to the second sliding surface 101.

In this thrust bearing 53, a load toward the second sliding surface 101 is imposed on the pressure-receiving portions 83 due to the difference between the compressive reaction for compressing the refrigerant and the force in thrust direction due to the back surface 32a-side pressure of the movable scroll. The average contact pressure of the pressure-receiving portions 83 due to this load is 0.5 to 20 MPa, or preferably, 2 to 15 MPa.

Further, the mixed fluid described above has the kinematic viscosity of 0.1 to 10 cst, or preferably 4 to 10 cst, on the sliding surfaces 100, 101 of the thrust bearing 53 under the aforementioned operating conditions of the scroll compressor 11, where 1 cst equals about $1 \times 10^{-6}$ m$^2$/sec.

The use of the scroll compressor 11 according to the above-mentioned embodiments under the operating conditions described above forms an oil film between the pressure-receiving portions 83 and the part of the second sliding surface 101 in opposed relation to the pressure-receiving portions 83, and therefore, the thrust bearing 53 can be used exclusively in fluid lubrication. As a result, the wear of the thrust bearing 53 is prevented and the scroll compressor 11 can be used for a long time while maintaining the performance thereof.

Although preferred embodiments of the invention are explained above, this invention is not limited to the aforementioned embodiments.

According to the embodiments described above, for example, the intermediate layer 101c has a four-layer laminated structure. Nevertheless, the intermediate layer 101c may include at least one layer, i.e. two or three layers or more than four layers.

Also, according to the aforementioned embodiments, the pressure-receiving portions 83 are circular. As an alternative, the pressure-receiving portions 83 may be oblong, elliptic, triangular or in the shape of a polygon having four or more sides.

EXAMPLES

The operational effects of the sliding surfaces 100, 101 of the scroll compressor according to this invention are further explained with reference to examples of the invention and comparative examples used for comparison with the invention. Nevertheless, this invention is not limited to these examples.

First Example

Figure 7A:
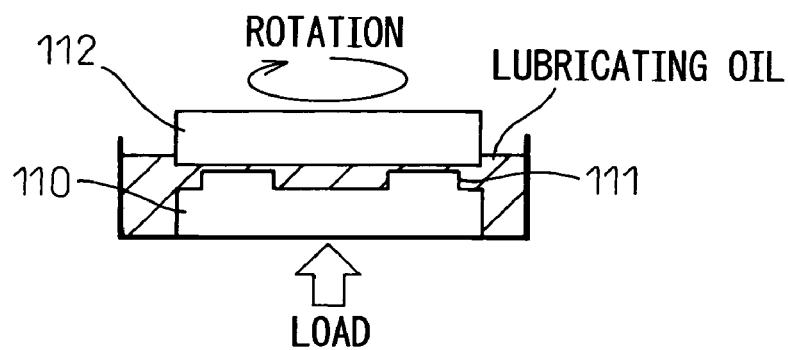
FIG. 7A is a schematic diagram for explaining the method of evaluating the seizure resistance.
Figure 7B:
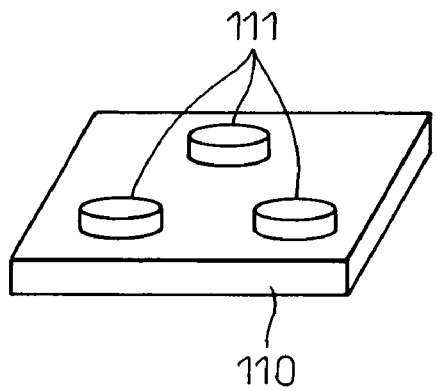
FIG. 7B is a perspective view of a fixed-side test piece in FIG. 7A.

As a test piece 110 of the scroll-side plate 53*a* having the first sliding surface 100, a steel plate having three solid-cylindrical pressure-receiving portions 111 as shown in FIGS. 7A and 7B was prepared. The three pressure-receiving portions 111 were formed in such a manner that the centers thereof were located at the apexes, respectively, of a regular triangle as shown in FIG. 7B. As a test piece 112 of the housing-side plate 53*b* having the second sliding surface 101, on the other hand, a steel plate was prepared of which one surface was formed with the diamond-like carbon layer and the intermediate layer.

In this way, the first example including the test piece 110 and the test piece 112 was obtained.

Comparative Example

A comparative example was obtained similarly to the first example except that the test piece 112 was formed with neither the diamond-like carbon layer nor the intermediate layer.
[Evaluation of Seizure Prevention Characteristic]
With reference to the first example and the comparative example described above, the seizure prevention characteristic was evaluated as described below.

As shown in FIG. 7A, the test pieces 110, 112 were arranged in such a manner that the pressure-receiving portions 111 and the diamond-like carbon layer of the test piece 112 are opposed to and in contact with each other in a carbon dioxide atmosphere. The contact portion between the pressure-receiving portions 111 and the diamond-like carbon layer of the test piece 112 was immersed in the lubricating oil. With the test piece 110 fixed, a load was imposed on the test piece 110 while at the same time rotating the test piece 112 at a predetermined rotational speed. The load was imposed on the test piece 110 in the direction toward the test piece 112. With the pressure-receiving portions 111 and the diamond-like carbon layer of the test piece 112 sliding with each other, the size of the load was increased stepwise. Then, the friction torque of the test piece 110 was measured, and it was determined that the seizure occurred at the time point when the torque was sharply increased. The load value at the time point when the friction torque was sharply increased was converted to the contact pressure of the sliding surfaces thereby to obtain a seizure limit contact pressure.

Figure 8:
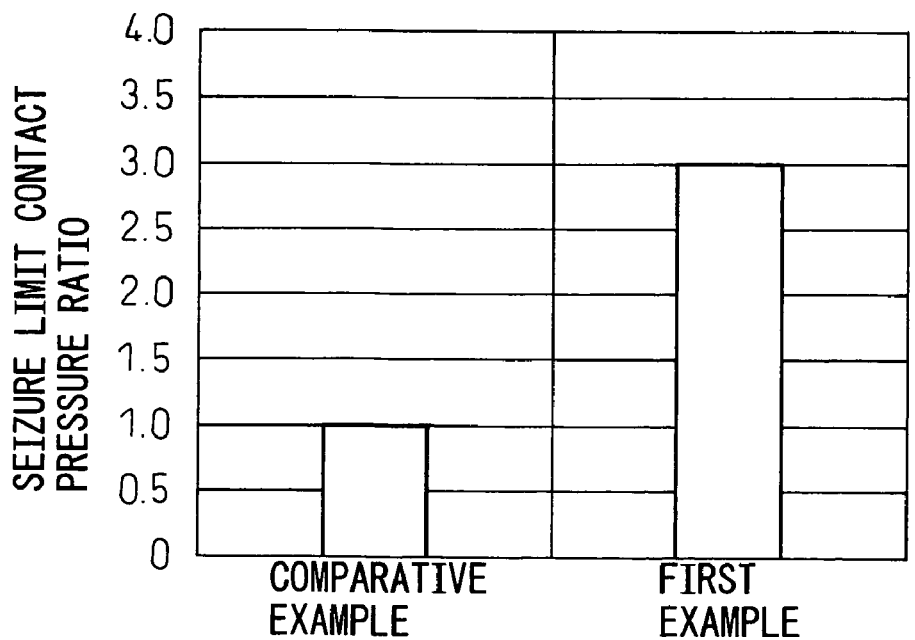
FIG. 8 is a diagram showing the result of evaluation of the seizure resistance.

The result is shown in FIG. 8.

The seizure limit contact pressure of the first example is about thrice that of the comparative example, thereby indicating a superior seizure prevention performance.

Second Example

The diamond-like carbon layer 101*a* and the intermediate layer 101*c* were formed on the base member 101*b* of the second sliding surface 101, and the scroll compressor shown in FIG. 1 was prepared thereby to obtain the second example. The diamond-like carbon layer 101*a* and the intermediate layer 101*c* were formed in a manner similar to the first example.
[Evaluation of Forming the Sagged Portions of the Pressure-receiving Portions Due to Running-in]
Using the scroll compressor according to the second example, the running-in was carried out for several hours according to the running-in conditions described above.

Figure 9A:
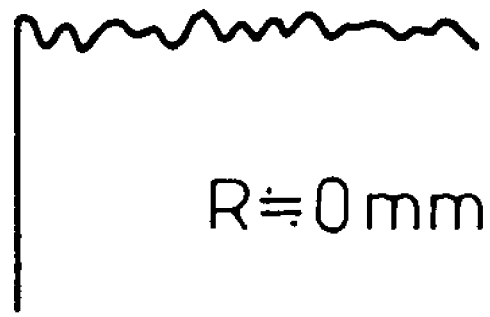
Figure 9B:
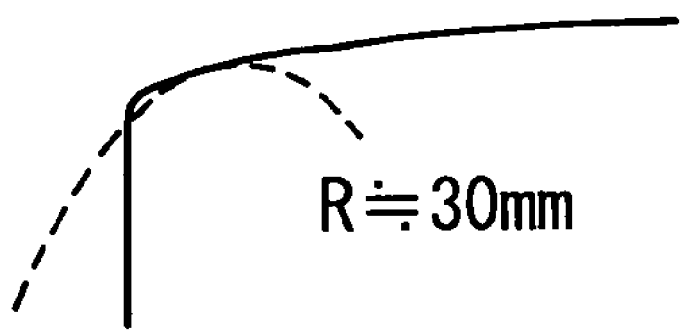

The result is shown in FIGS. 9A, 9B. FIGS. 9A, 9B show the shape of the pressure-receiving portion 83 before and after the running-in.

According to the second example, no sagged portion was formed along the peripheral edge of the pressure-receiving portion 83 and the radius of curvature was about zero before the running-in as shown in FIG. 9A, while the sagged portion 83*b* having the radius of curvature R of about 30 mm was formed along the peripheral edge of the pressure-receiving portion 83 after the running-in as shown in FIG. 9B.

Third Example

Steel was used for the test piece of the scroll-side plate 53*a* having the first sliding surface 100. Steel was also used for the base member of the test piece of the housing-side plate 53*b* having the second sliding surface 101. The intermediate layer was formed on this base member, and further, the diamond-like carbon layer was formed on the intermediate layer thereby to obtain the third example.

In the second sliding surface 101, the total thickness including the diamond-like carbon layer and the intermediate layer was about 2 μm. Also, the maximum surface roughness of the diamond-like carbon layer of the second sliding surface 101 was about 0.2 μm.

Fourth Example

The fourth example was obtained in a similar fashion to the third example except that the maximum roughness of the front surface of the diamond-like carbon layer of the second sliding surface 101 was set to about 0.4 μm.

Fifth Example

The fifth example was obtained in a similar fashion to the third example except that the maximum roughness of the front surface of the diamond-like carbon layer of the second sliding surface 101 was set to about 0.6 μm.

Sixth Example

The sixth example was obtained in a similar fashion to the third example except that the maximum roughness of the front surface of the diamond-like carbon layer of the second sliding surface 101 was set to about 1.0 μm.
[Evaluation of Wear Amount]
With reference to the third to sixth examples described above, the wear amount was evaluated as described below.

Figure 10:
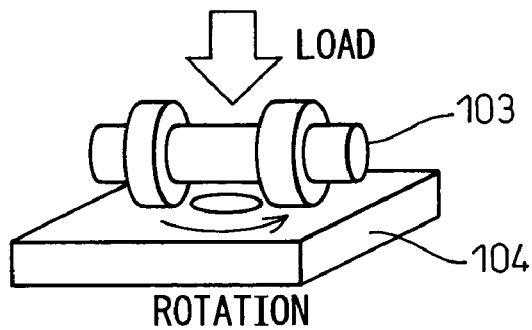
FIG. 10 is a schematic diagram for explaining the method of evaluating the wear amount.

The wear amount was evaluated using the barbell plate tester shown in FIG. 10. The barbell plate tester includes a barbell 103 with a pair of disks fixed in spaced relation with each other on a solid-cylindrical shaft and a plate 104 on which the barbell is placed. The sliding surfaces of the barbell 103 and the plate 104 are curved surface or planar and have no unevenness.

The disks in the pair were each prepared from the test piece of the scroll-side plate 53a, and the plate 104 was prepared from the test piece of the housing-side plate 53b.

The sizes of the disks in the pair were each 14 mm in outer diameter and 5 mm in thickness. The length between the disks on the barbell was 21 mm. The size of the plate 104 was 30 mm in the length of each of the four sides thereof.

The plate 104 was immersed in the lubricating oil, and so was the sliding surfaces of the barbell 103 and the plate 104. In conducting the test, a predetermined load was imposed on the barbell 103 from above, and under this condition, the plate 104 was rotated for a predetermined time at a predetermined rotational speed, after which the wear amount of the barbell 103 was measured.

The slide operation of the barbell 103 and the plate 104 was such that the diamond-like carbon layer of the second sliding surface 101 slid with the first sliding surface 100.

The test was conducted under a plurality of measurement conditions in combinations of the load and the rotational speed. Specifically, the load was in the range of 0 to 1000 N (0 to 500 MPa in contact pressure), and the rotational speed in the range of 0 to 2000 rpm (0 to 2 m/sec in sliding speed).

First, the specific wear amount according to the third example was measured as described below.

The measurement was made a plurality of times using the barbell plate tester while changing the product of the contact pressure and the sliding distance, and the wear amount of the test piece on the barbell 103 side was measured. The sliding distance was determined from the product of the rotational speed and the time. The wear amount, on the other hand, was determined as a volume of the test piece reduced by wear. The barbell 103 and the plate 104 were in boundary lubrication.

Using the measurement result thus obtained, the specific wear amount was determined from the inclination of a curve plotted with the product of the contact pressure and the sliding distance as abscissa and the wear amount as ordinate.

Next, the estimated wear amount according to the third example was determined as described below. The estimated wear amount is defined as a wear amount of an actual machine estimated based on the specific wear amount described above.

While an actual machine was operated under predetermined conditions, the wear amount A in boundary lubrication was determined from the product of the specific wear amount, the contact pressure and the sliding distance of the thrust bearing 53. Taking the oil film parameter into consideration, the estimated wear amount in mixed lubrication was determined from the wear amount A.

In the fourth to sixth examples, each estimated amount was determined similarly, and with the estimated wear amount of the third example as a reference, each wear amount ratio was determined from the other estimated wear amounts.

Figure 11:
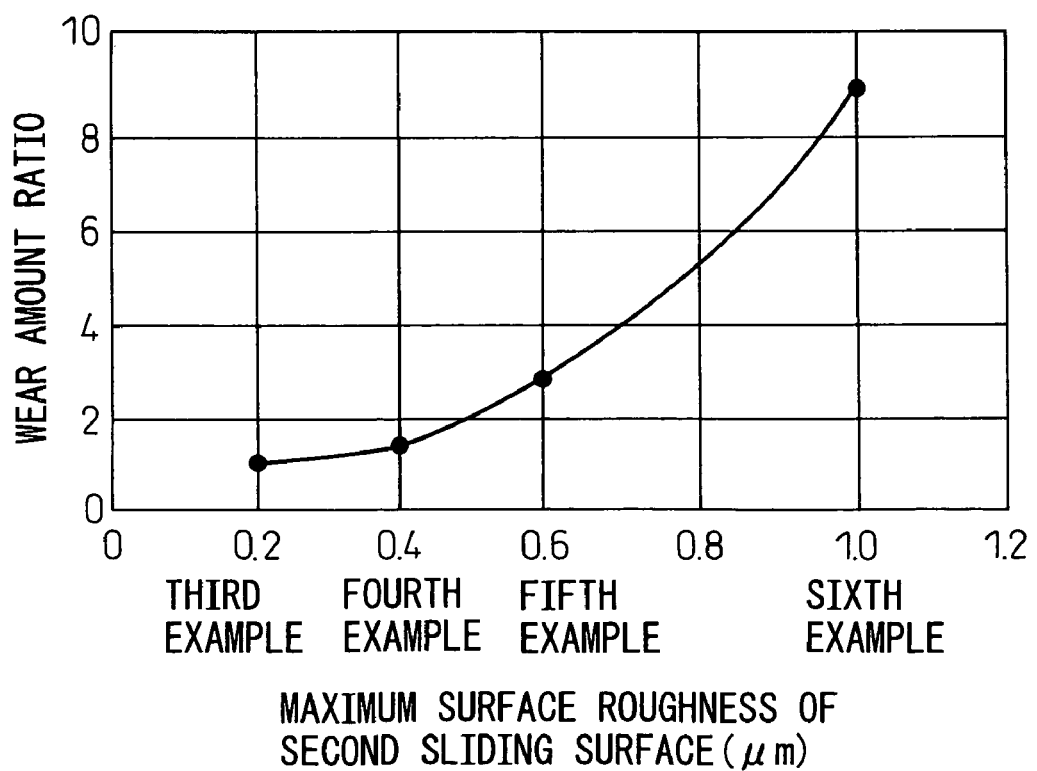
FIG. 11 is a diagram showing the result of evaluation of the wear amount.

The result is shown in FIG. 11.

With the decrease in the maximum roughness of the front surface of the diamond-like carbon layer of the second sliding surface 101, the wear amount ratio of the first sliding surface 100 was found to decrease.

What is claimed is:

1. A compressor comprising a thrust bearing including a first sliding surface and a second sliding surface in opposed relation to the first sliding surface, wherein the first sliding surface is formed with a plurality of insular pressure-receiving portions surrounded by grooves and independent of each other, and the second sliding surface is flat as compared with the first sliding surface, wherein the second sliding surface is formed with a diamond-like carbon layer, and wherein the pressure-receiving portions comprise a sagged portion along a peripheral edge which is produced by revolving the first sliding surface with respect to the second sliding surface so that the peripheral edge of the pressure-receiving portions which has high contact pressure is worn, and a height of the peripheral edge in a protruding direction of the pressure-receiving portions from the grooves becomes lower than an inside area of the pressure-receiving portions, wherein the radius of curvature of the peripheral edge of the pressure-receiving portions in a cross section substantially parallel to the protruding direction of the pressure-receiving portions is about zero before revolving the first sliding surface.

2. The compressor according to claim 1, wherein the pressure-receiving portions are in the shape of selected one of a triangle, a circle, an oblong figure, a triangle and a polygon having at least four sides, and a plurality of the pressure-receiving portions are arranged in staggered fashion.

3. The compressor according to claim 1, wherein maximum surface roughness of the second sliding surface is smaller than a maximum surface roughness of the pressure-receiving portions.

4. The compressor according to claim 1, comprising a fixed scroll and a movable scroll for compressing a fluid by revolving with respect to the fixed scroll on a rotary shaft, wherein the thrust bearing receives axial force received by the movable scroll.

5. The compressor according to claim 4, wherein the fluid contains carbon dioxide and pressure of the fluid discharged exceeds a critical pressure of carbon dioxide.

6. The compressor according to claim 1, wherein a base member of the second sliding surface is formed of selected one of alloy steel for machine construction and rolled plate steel.

7. The compressor according to claim 1, wherein
the second sliding surface is formed with an intermediate layer between a base member of the second sliding surface and the diamond-like carbon layer, and
the intermediate layer is formed of at least selected one of materials including chromium, aluminum, tungsten, tantalum, molybdenum, niobium, carbon and titanium.

8. The compressor according to claim 1, wherein the second sliding surface is deformed elastically when a load is imposed on the pressure-receiving portions and the second sliding surface thereby to generate high contact pressure along the peripheral edge of the pressure-receiving portions and low contact pressure in the inside area of the pressure-receiving portions.

* * * * *